(12) United States Patent
Baik

(10) Patent No.: US 7,532,903 B2
(45) Date of Patent: May 12, 2009

(54) METHOD FOR PERFORMING TRS COMMUNICATION IN A MOBILE COMMUNICATION TERMINAL

(75) Inventor: Jong-Min Baik, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 588 days.

(21) Appl. No.: 11/384,849

(22) Filed: Mar. 20, 2006

(65) Prior Publication Data

US 2006/0234748 A1    Oct. 19, 2006

(30) Foreign Application Priority Data

Mar. 18, 2005    (KR) ...................... 10-2005-0022870

(51) Int. Cl.
   *H04Q 7/20*      (2006.01)
(52) U.S. Cl. ...................... 455/458; 455/459; 455/518; 455/509; 455/517; 455/450; 370/352; 370/401
(58) Field of Classification Search ................ 455/458, 455/459, 518, 519, 450–452; 370/352, 401
   See application file for complete search history.

(56) References Cited

U.S. PATENT DOCUMENTS 7,289,816 B2 * 10/2007 Mills .......................... 455/458

FOREIGN PATENT DOCUMENTS

| KR | 2002-0056777 | 7/2002 |
|----|--------------|--------|
| KR | 2004-0100150 | 12/2004 |

* cited by examiner

*Primary Examiner*—Charles N Appiah
*Assistant Examiner*—Randy Peaches
(74) *Attorney, Agent, or Firm*—The Farrell Law Firm, PC

(57) ABSTRACT

A method for performing communication in a mobile communication terminal capable of TRS communication. In the method, the mobile communication terminal periodically searches for another TRS channel or a mobile communication paging channel even though the mobile communication terminal is in communication or is in TRS communication, and informs a user of reception of TRS paging signals having a TRS channel authentication code or call termination, thereby either performing another TRS communication or mobile communication through connection to a communication channel according to user's selection. Accordingly, it is possible to efficiently manage a plurality of TRS channels or mobile communication channels, and receive and process only TRS signals including a specific TRS channel authentication code from among TRS signals of unspecified persons. Further, it is possible to curtail power consumption of the mobile communication terminal.

12 Claims, 7 Drawing Sheets

METHOD FOR PERFORMING TRS COMMUNICATION IN A MOBILE COMMUNICATION TERMINAL

PRIORITY

This application claims priority to an application entitled "Method For Performing Communication In Mobile Communication Terminal Capable Of TRS Communication" filed in the Korean Intellectual Property Office on Mar. 18, 2005 and assigned Ser. No. 2005-22870, the contents of which are incorporated herein by reference.

BACKGROUND OF THE INVENTION

1. Field of the Invention

The present invention relates generally to a mobile communication terminal capable of performing communication (TRS communication) using a Trunked Radio System (TRS), and more particularly to a method for efficiently performing mobile communication and TRS communication.

2. Description of the Related Art

TRS communication is characterized in that it calls unspecified persons while continuously opening a specific channel. That is, in TRS communication, a plurality of channels may be selected and unspecified persons are called for each selected channel. In order to perform TRS communication in a mobile communication terminal, it is necessary to always connect to a channel used in TRS communication, i.e., a TRS channel, and respond to signals received from unspecified persons, while holding a mobile communication channel. Therefore, when another channel is used in TRS communication, inefficiency and power waste due to TRS channel searching may occur.

Further, even though a TRS channel is fixed, inefficiency may occur because all messages from unspecified persons must be processed. Power waste is a very important issue in the use of a mobile communication terminal. Accordingly, it is necessary to provide a method capable of efficiently searching for a channel between mobile communication and TRS communication, and efficiently searching and managing other channels also in a single mode for TRS communication, in order to prevent power waste.

In order for a conventional mobile communication terminal capable of performing TRS communication, i.e., a TRS mobile communication terminal, to enter a mode used for TRS communication, i.e., a TRS communication mode, a mode and a channel must be manually changed by a user. In setting a channel, there is an inconvenience in that users must define a channel in advance and set the TRS channel.

Further, in order for a plurality of designed groups to communicate with a plurality of channels by radio, communication with all groups is not performed, rather only a designed group is selected and a channel is fixed. Therefore, an inconvenience may occur.

Furthermore, there is an inconvenience in that it is necessary to respond to calls of undesired, unspecified persons also over the same TRS channel.

Moreover, all users using the same TRS channel may be interfered by unspecified persons in the same area.

A user may use a plurality of TRS channels to communicate with a plurality of groups, but the user must fix a corresponding TRS channel in order to communicate with a desired group. Further, the user must perform a channel change in order to communicate with another group in the TRS channel, such that it is impossible to have a correlation with the TRS channel currently in communication.

Furthermore, because all users using the same TRS channel continuously receive calls from unspecified persons in the same area, battery waste often occurs.

SUMMARY OF THE INVENTION

Accordingly, the present invention has been designed to solve the above and other problems occurring in the prior art.

It is an object of the present invention to provide a method for efficiently searching for a mobile communication channel and a plurality of TRS channels.

It is another object of the present invention to provide a method for reducing power consumption of a mobile communication terminal.

It is yet another object of the present invention to provide a method for receiving only desired TRS signals.

In order to accomplish the aforementioned and other objects, according to an aspect of the present, there is provided a method for performing communication in a mobile communication terminal capable of performing TRS communication. The method includes changing to a communication standby mode only during a paging reception interval of a random TRS channel when a current time point corresponds to a paging reception time point of the random TRS channel according to a preset paging period and the mobile communication terminal is in communication; connecting to the random TRS channel; detecting paging signals including a TRS channel authentication code having been preset corresponding to the random TRS channel; informing a user of reception of TRS signals when the paging signals including the TRS channel authentication code are detected; changing to the communication standby mode when TRS communication change request is received from the user; and connecting to the TRS channel in order to perform the TRS communication According to another aspect of the present, there is provided a method for performing communication in a mobile communication terminal capable of performing TRS communication. The method includes connecting to a random TRS channel and detecting paging signals including a TRS channel authentication code having been preset corresponding to the random TRS channel, when a current time point corresponds to a paging reception time point of the random TRS channel according to a preset paging period; and connecting to the random TRS channel and performing the TRS communication when the paging signals including the TRS channel authentication code are detected.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments according to the present invention will be described in detail with reference to the accompanying drawings. In the following description of the present invention, a detailed description of known functions and configurations incorporated herein will be omitted when it may obscure the subject matter of the present invention.

Figure 1:
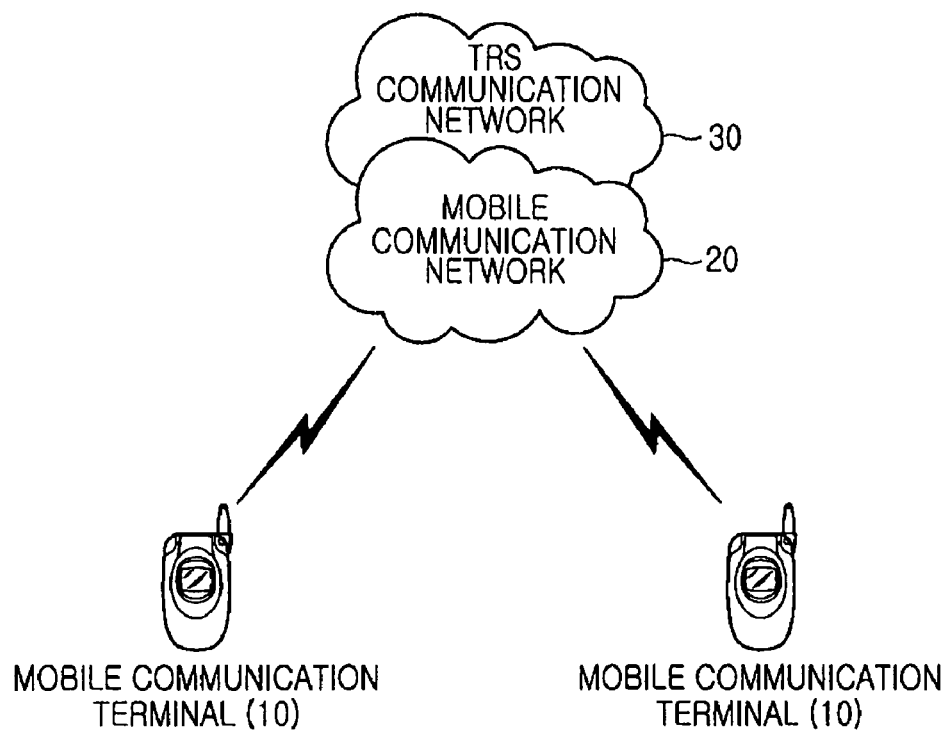
FIG. 1 is a block diagram illustrating a communication system to which the present invention is applied.

FIG. 1 is a block diagram illustrating a communication system to which the present invention is applied. Referring to FIG. 1, the communication system includes a mobile communication network 20, a network 30 for Trunked Radio System (TRS) communication (TRS communication network), and a plurality of mobile communication terminals 10 capable of performing TRS communication. The mobile communication network 20 and the TRS communication network 30 inter-work with each other, thereby providing the mobile communication terminals 10 with mobile communication and TRS communication.

Figure 2:
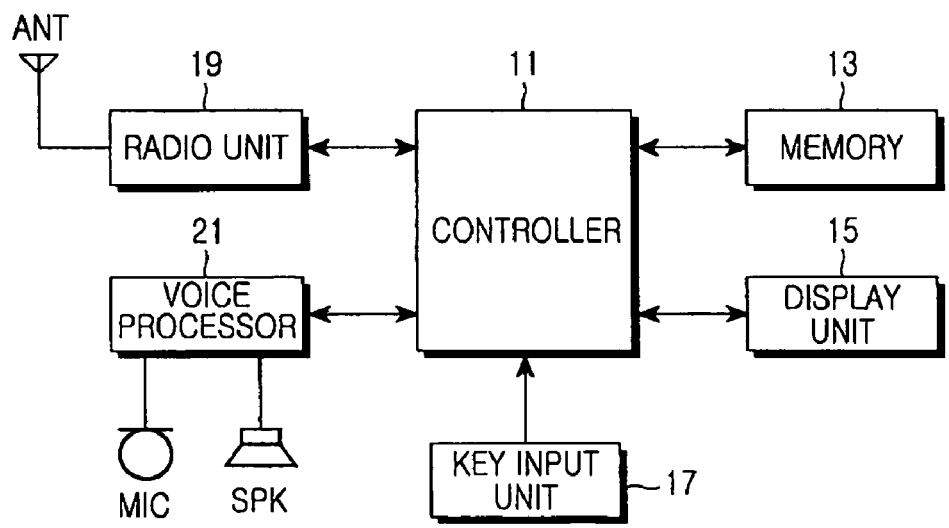
FIG. 2 is a block diagram illustrating a mobile communication terminal to which the present invention is applied.

FIG. 2 is a block diagram illustrating the mobile communication terminal 10 capable of performing the TRS communication, to which the present invention is applied. Referring to FIG. 2, the mobile communication terminal 10 includes a controller 11, a memory 13, a display unit 15, a key input unit 17, a radio unit 19, and a voice processor 21. The memory 13 stores program for processing and control of the controller 11, reference data, various renewable data for storage, etc., which is provided as a working memory of the controller 11. The display unit 15 displays various image information, images received from a communication network, and/or images stored in the memory 13 on a screen under the control of the controller 11. The key input unit 17 preferably includes number keys 0~9, keys * and #, and a plurality of function keys for a menu, a selection, communication, deletion, power/end, volume, photographing, etc., corresponding to various functions of the mobile communication terminal. Further, the key input unit 17 provides the controller 11 with key input data corresponding to keys pressed by a user.

The radio unit 19 exchanges signals with the mobile communication network 20 and the TRS communication network 30 through an antenna. That is, the radio unit 19 modulates transmission signals input from the controller 11 in order to transmit RF signals through the antenna, and demodulates RF signals received through the antenna in order to provide the demodulated signals to the controller 11.

The voice processor 21 connected to the controller 11, and a microphone MIC and a speaker SPK connected to the voice processor 21 are used for phone communication and voice recording.

The mobile communication terminal 10 operates in either a mode for both TRS communication and mobile communication, a dedicated TRS communication mode, or a dedicated mobile communication mode. The mode for both TRS communication and mobile communication is an operation mode for performing both TRS communication and mobile communication, the dedicated TRS communication mode is an operation mode for performing only TRS communication, and the dedicated mobile communication mode is an operation mode for performing general mobile communication.

When the mode for both TRS communication and mobile communication is set, the mobile communication terminal 10 searches for a mobile communication paging channel and a plurality of TRS channels according to a preset paging period. Herein, when specific paging signals are detected, the mobile communication terminal 10 connects to a channel, from which the corresponding paging signals are detected, for communication. The mobile communication terminal 10 performs TRS communication only when TRS communication paging signals including a preset TRS channel authentication code are detected. The TRS channel authentication code is allocated to each TRS communication group including a plurality of mobile communication terminals intended for performance of TRS communication. The TRS channel authentication code is input by a user when a TRS channel is set in the mobile communication terminal 10, is set according to each TRS channel, and is automatically included in voice data when the voice data are transmitted through a corresponding TRS channel.

Further, the mobile communication terminal 10 connects to a corresponding TRS channel and performs the TRS communication only when voice data including the TRS channel authentication code are received. Accordingly, even though a plurality of TRS communication groups using one TRS channel exist, only mobile communication terminals having received the same TRS channel authentication code can perform the TRS communication.

During a paging period, a TRS channel is searched for detecting paging signals including an authentication code of a predetermined channel. The paging period corresponding to each TRS channel must be set to avoid overlap with both a reception period, i.e., a paging reception interval, of paging signals of each TRS channel and a reception interval of a mobile communication paging channel. The paging reception interval is too short for a person to recognize it.

Further, the mobile communication terminal 10 transmits voice data according to the paging period in the TRS communication. The paging signals correspond to the voice data received according to the paging period.

Figure 8:
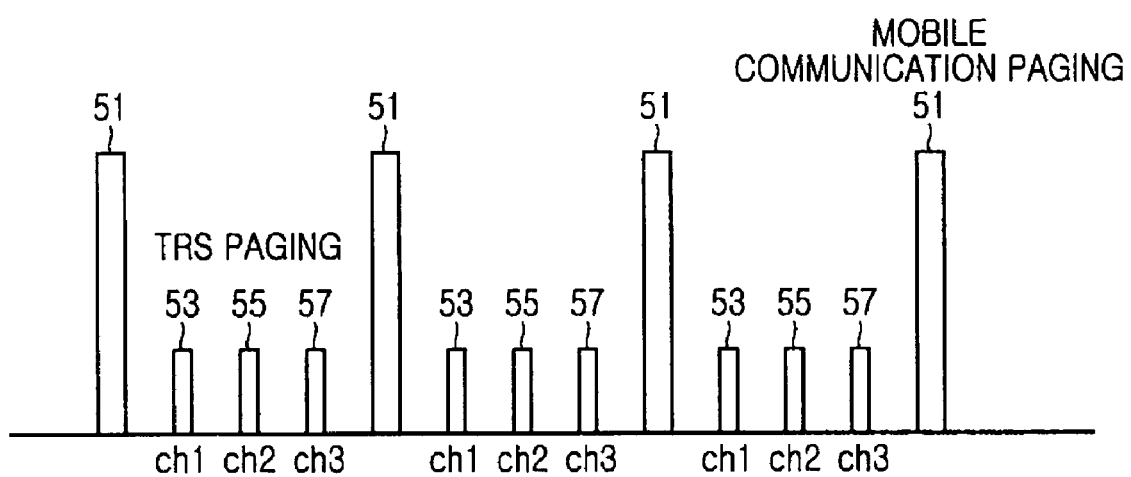
FIG. 8 is a diagram illustrating a paging period according to an embodiment of the present invention.

FIG. 8 illustrates the paging period for a plurality of TRS channels according to an embodiment of the present invention. As illustrated in FIG. 8, the paging period of a TRS channel must be set so that the mobile communication paging reception interval 51 and the first to the third TRS channel paging reception intervals 53, 55, and 57 do not overlap with one another. When the dedicated TRS communication mode is set, the mobile communication terminal searches for a plurality of TRS channels according to an each preset paging period. Herein, when paging signals including a TRS channel authentication code corresponding to each TRS channel are detected, the mobile communication terminal 10 connects to a corresponding TRS channel and performs TRS communication.

The mode for both TRS communication and mobile communication and the dedicated TRS communication mode are set under the setup mode of a TRS communication mode, and this process will be described in detail herein below with reference to FIG. 3.

Figure 3:
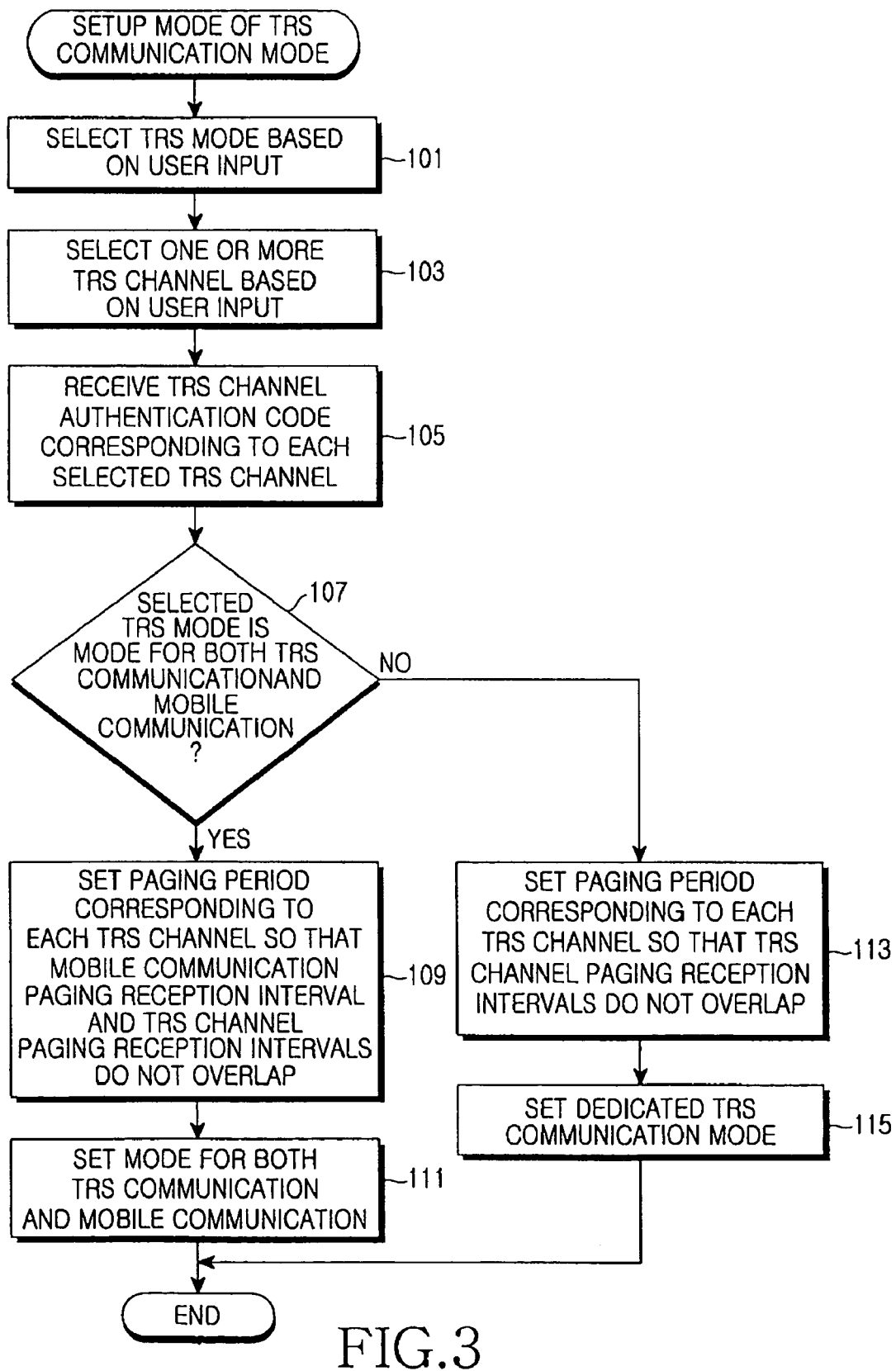
FIG. 3 is a flow diagram illustrating a process for setting a communication mode of a mobile communication terminal according to an embodiment of the present invention.

FIG. 3 is a flow diagram illustrating a process for setting a communication mode by the mobile communication terminal 10 according to an embodiment of the present invention. Referring to FIG. 3, in step 101, the controller 11 of the mobile communication terminal 10 selects a TRS communication mode input from a user in the setup mode of the TRS communication mode. In step 103, the controller 11 selects one or more TRS channel based on user input. In step 105, the controller 11 receives a TRS channel authentication code corresponding to each selected TRS channel and sets the TRS channel authentication code in each TRS channel.

In step 107, the controller 11 checks if the TRS communication mode selected in step 101 is the mode for both TRS communication and mobile communication. When the selected TRS communication mode corresponds to the mode for both TRS communication and mobile communication, step 109 is performed. However, when the selected TRS communication mode does not correspond to the mode for both TRS communication and mobile communication, i.e., when the selected TRS communication mode corresponds to the dedicated TRS communication mode, step 113 is performed.

In step 109, the controller 11 sets a paging period corresponding to each selected TRS channel so that the mobile communication paging reception interval and the TRS channel paging reception intervals do not overlap with one another. In step 111, the controller 11 sets the mode for both TRS communication and mobile communication and ends the operation process.

When the TRS communication mode selected in step 107 is the dedicated TRS communication mode, the controller 11 sets the paging period corresponding to said each selected TRS channel so that the TRS channel paging reception intervals do not overlap with each another in step 113. In step 115, the controller 11 sets the dedicated TRS communication mode and ends the operation process.

Figure 4:
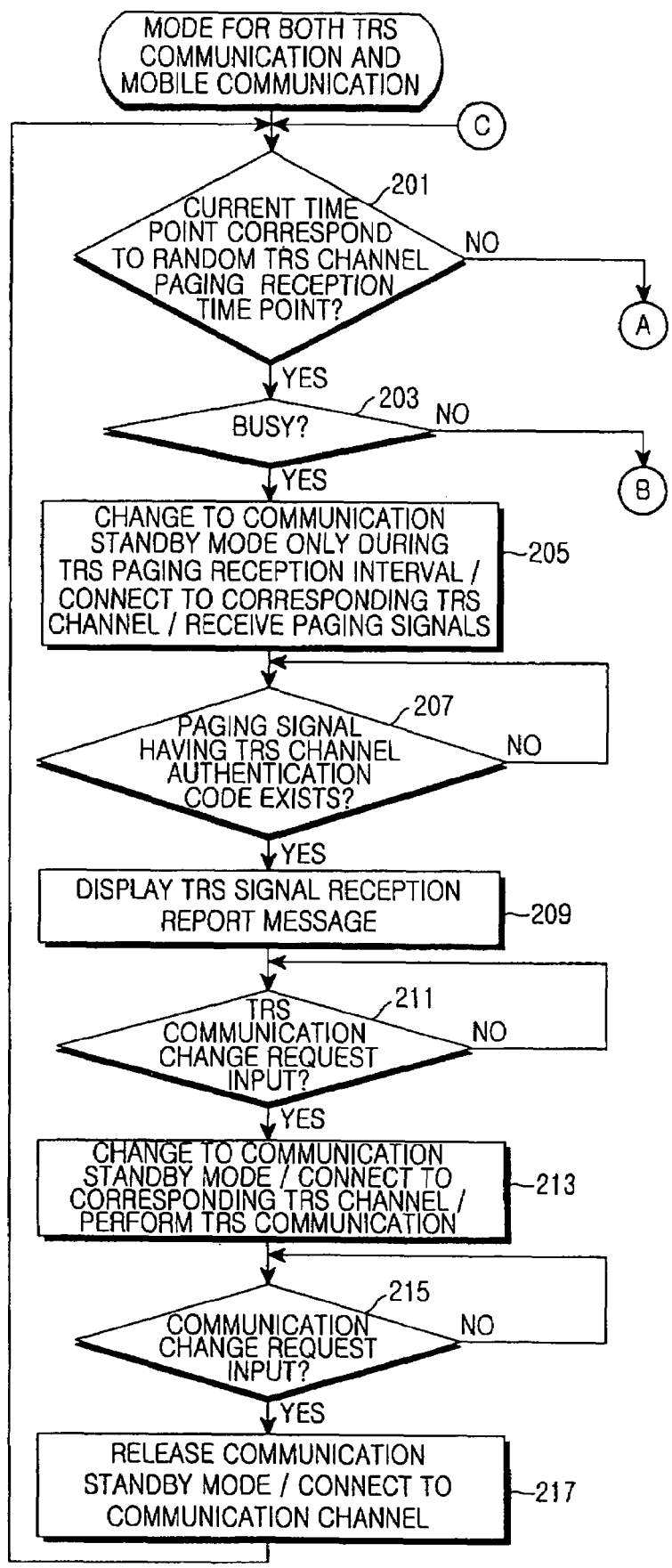
FIG. 4 is a flow diagram illustrating an operation of a mobile communication terminal according to an embodiment of the present invention, when the mobile communication terminal is in communication under the mode for both TRS communication and mobile communication.
Figure 5:
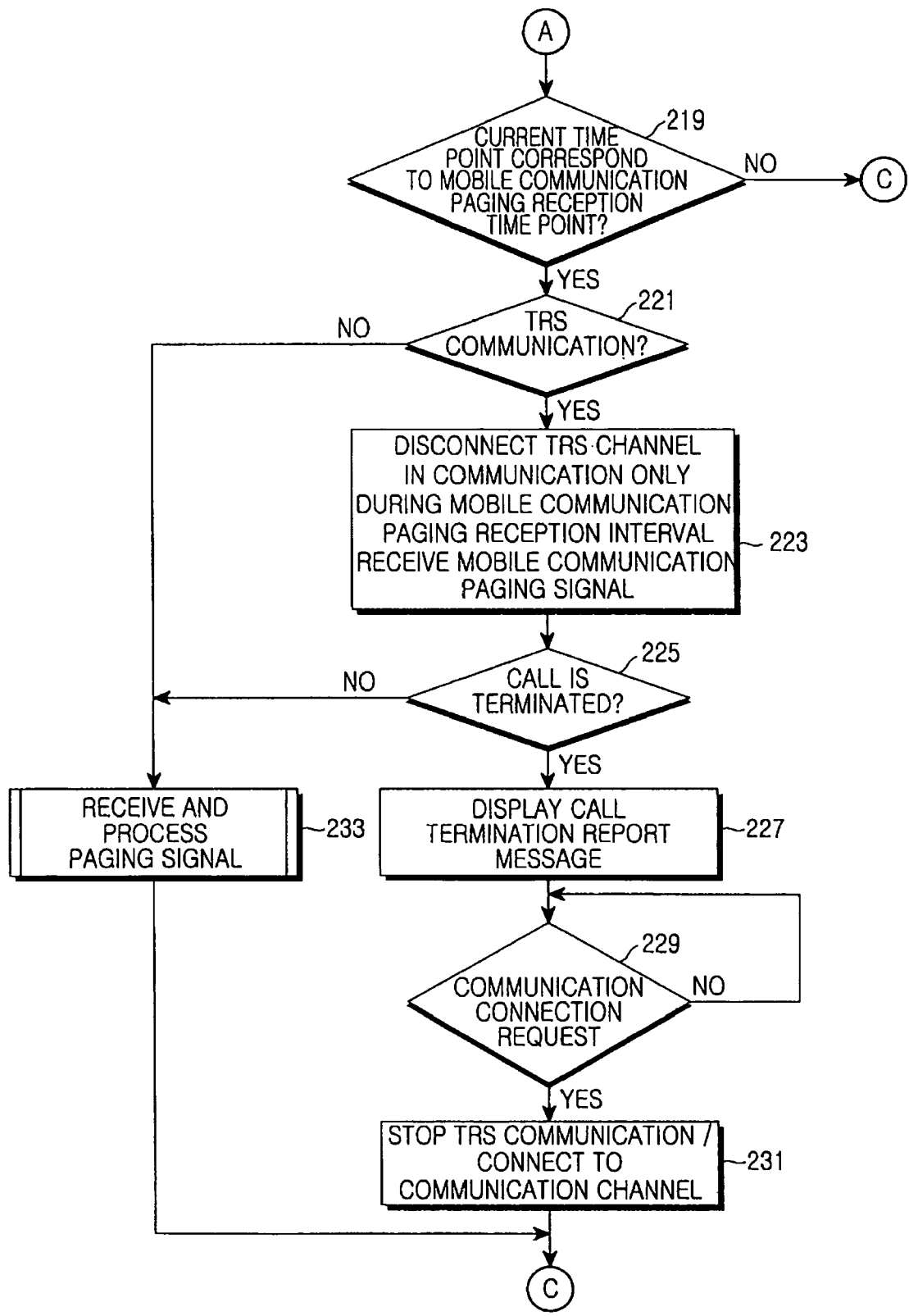
FIG. 5 is a flow diagram illustrating an operation of a mobile communication terminal according to an embodiment of the present invention, when a call is terminated under the mode for both TRS communication and mobile communication.
Figure 6:
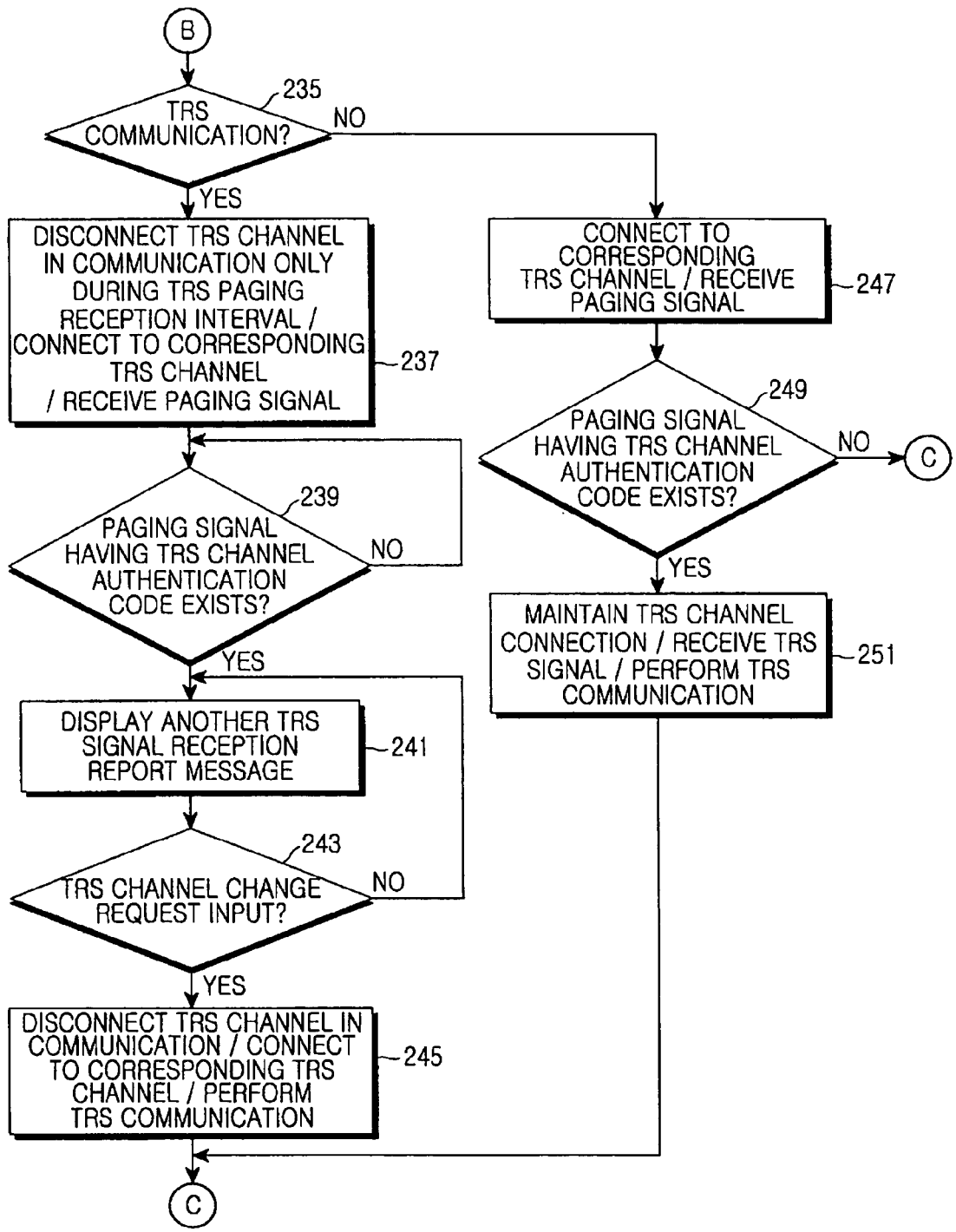
FIG. 6 is a flow diagram illustrating an operation of a mobile communication terminal according to an embodiment of the present invention, when the mobile communication terminal is in TRS communication under the mode for both TRS communication and mobile communication.

FIGS. 4 to 7 illustrate an operation process of the mobile communication terminal 10 in which the mode for both TRS communication and mobile communication or the dedicated TRS communication mode has been set by the process as described above. More specifically, FIG. 4 is a flow diagram illustrating an operation of the mobile communication terminal 10 according to an embodiment of the present invention, when the mobile communication terminal 10 is in communication under the mode for both TRS communication and mobile communication, FIG. 5 is a flow diagram illustrating an operation of the mobile communication terminal 10 according to an embodiment of the present invention, when a call is terminated under the mode for both TRS communication and mobile communication, and FIG. 6 is a flow diagram illustrating an operation of the mobile communication terminal 10 according to an embodiment of the present invention, when the mobile communication terminal 10 is in TRS communication under the mode for both TRS communication and mobile communication.

Referring to FIG. 4, in step 201, the controller 11 of the mobile communication terminal 10 determines if the current time point corresponds to a random TRS channel paging reception time point. When the current time is the random TRS channel paging reception time point, step 203 is performed. However, when the current time does not correspond to the random TRS channel paging reception time point, the procedure proceeds to "A". That is, step 219 of FIG. 5 is performed.

In step 203, the controller 11 determines if the mobile communication terminal 10 is communicating (or busy). When the mobile communication terminal 10 is communicating, step 205 is performed. However, when the mobile communication terminal 10 is not in communication, the procedure proceeds to "B". That is, step 235 of FIG. 6 is performed.

In step 205, the controller 11 changes the communication channel to a communication standby mode, only during a TRS paging reception interval, connects to a corresponding TRS channel, and receives paging signals. That is, when the TRS paging reception interval ends, the controller 11 ends the communication standby mode and connects to a communication channel.

In step 207, the controller 11 detects if paging signals having a TRS channel authentication code, which has been preset by the mobile communication terminal 10 corresponding to the random TRS channel, exist in the received paging signals. When the paging signals having the corresponding TRS channel authentication code are detected, the controller 11 displays a TRS signal reception report message in step 209. When TRS communication change request input is received from a user in step 211, the controller 11 changes to the communication standby mode and connects to a corresponding TRS channel in order to perform TRS communication in step 213.

When there is communication change request in step 215, the controller 11 disconnects the TRS channel, releases the communication standby mode, and connects to the communication channel in step 217. Thereafter, the process returns to step 201.

As described above, the mobile communication terminal 10 periodically searches for the TRS channel in the mode for both TRS communication and mobile communication even though the mobile communication terminal 10 is communicating. When TRS paging signals are detected, the mobile communication terminal 10 informs the user of the detection of the TRS paging signals, and connects to the TRS channel according to the user's selection, thereby enabling the TRS communication. Herein, because only the TRS paging signals including a specific TRS channel authentication code are detected, only desired TRS communication is performed.

As described above, when the current time point is not the random TRS channel paging reception time point in step 201, the procedure proceeds to "A". That is, step 219 of FIG. 5 is performed.

Referring to FIG. 5, in step 219, the controller 11 determines if the current time point corresponds to a mobile communication paging reception time point. When the current time point does not correspond to the mobile communication paging reception time point, the procedure proceeds to "C". That is, step 201 of FIG. 4 is performed.

However, when the current time point corresponds to the mobile communication paging reception time point, the controller 11 determines if the mobile communication terminal 10 is in TRS communication in step 221. When the mobile communication terminal 10 is in TRS communication, step 223 is performed. However, when the mobile communication terminal 10 is not in TRS communication, step 233 is performed in order to receive mobile communication paging signals. Then, the procedure proceeds to "C". That is, step 201 of FIG. 4 is performed.

In step 223, the controller 11 disconnects a TRS channel currently in communication only during a mobile communication paging reception interval, and receives the mobile communication paging signals.

In step 225, the controller 11 determines if a call is terminated. When the call is terminated, step 227 is performed. However, when the call is not terminated, step 233 is performed in order to receive the mobile communication paging signals. Then, the procedure proceeds to "C".

In step 227, the controller 11 displays a call termination report message. In step 229, the controller 11 determines if communication connection request is received from the user. When the communication connection request is received from the user, the controller 11 stops the TRS communication and connects to a communication channel in step 231. Thereafter, the procedure proceeds to "C", i.e., returns to step 201 of FIG. 4.

According to the present invention as described above, the mobile communication terminal 10 periodically checks the paging of the mobile communication channel while performing the TRS communication under the mode for both TRS communication and mobile communication. When the call is terminated, the mobile communication terminal 10 informs the user of the call termination, and connects to the communication channel according to the user's selection, in order to perform general mobile communication.

When it is determined that the mobile communication terminal 10 is not in the communication in the random TRS channel paging reception time point in step 203 of FIG. 4, the procedure proceeds to "B", i.e., proceeds to step 235 of FIG. 6. Referring to FIG. 6, in step 235, the controller 11 determines if the mobile communication terminal 10 is in TRS communication. When the mobile communication terminal 10 is in TRS communication, the controller 11 disconnects the TRS channel in communication only during the TRS paging reception interval of the random TRS channel, connects to a corresponding TRS channel, and receives paging signals in step 237.

In step 239, the controller 11 detects if paging signals having the TRS channel authentication code, which has been preset by the mobile communication terminal 10 corresponding to the random TRS channel, exist in the received paging signals. When the paging signals having the corresponding TRS channel authentication code are detected, the controller 11 displays a reception report message of other TRS channel signals in step 241.

In step 243, the controller 11 determines if TRS channel change request input is received. When the TRS channel change request input is received, step 245 is performed. That is, the controller 11 disconnects the TRS channel in communication, connects to the corresponding TRS channel, and performs the TRS communication. Thereafter, the procedure proceeds to "C", i.e., proceeds to step 201 of FIG. 4.

When the mobile communication terminal 10 is not in TRS communication in step 235, the controller 11 connects to the corresponding TRS channel and receives the paging signals in step 247. In step 249, the controller 11 detects if the paging signals having the TRS channel authentication code, which has been preset by the mobile communication terminal 10 corresponding to the random TRS channel, exist in the received paging signals. When the paging signals having the corresponding TRS channel authentication code are detected, step 251 is performed. However, when the paging signals having the corresponding TRS channel authentication code are not detected, the procedure proceeds to "C".

In step 251, the controller 11 maintains the connection of the random TRS channel in order to receive the TRS signals and perform the TRS communication. Thereafter, the procedure proceeds to "C".

According to the present invention as described above, the mobile communication terminal 10 searches for another TRS channel while performing the TRS communication under the mode for both TRS communication and mobile communication. When specific paging signals are detected, the mobile communication terminal 10 informs the user that the TRS signals have been received from said another TRS channel and enables the TRS communication to be performed through said another TRS channel according to the user's selection.

Figure 7:
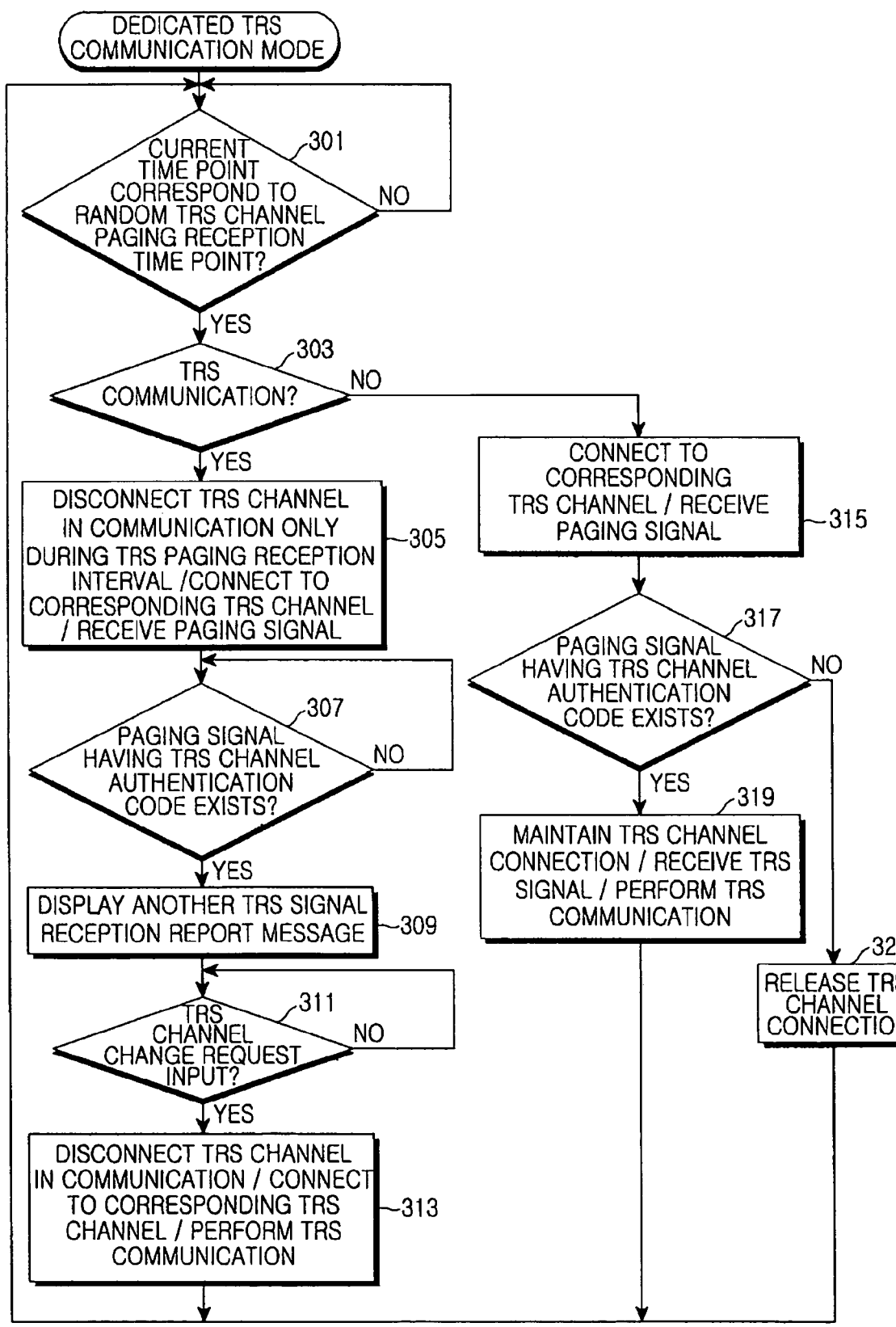
FIG. 7 is a flow diagram illustrating an operation of a mobile communication terminal under the dedicated TRS communication mode according to an embodiment of the present invention.

FIG. 7 is a flow diagram illustrating an operation of the mobile communication terminal 10 under the dedicated TRS communication mode according to an embodiment of the present invention. The operation process of the mobile communication terminal 10 in which the dedicated TRS communication mode is similar to that illustrated in FIG. 6.

Referring to FIG. 7, in step 301, the controller 11 of the mobile communication terminal 10 determines if the current time point corresponds to a random TRS channel paging reception time point. When the current time is the random TRS channel paging reception time point, the controller 11 determines whether the TRS communication is currently performed in step 303, and if it is determined that the TRS communication is currently performed, step 305 is performed. If it is determined that the TRS communication is not currently performed, step 315 is performed.

In step 305, the controller 11 disconnects a TRS channel in communication only during the TRS paging reception interval of the random TRS channel, connects to a corresponding TRS channel, and receives paging signals. In step 307, the controller 11 detects if paging signals having the TRS channel authentication code, which has been preset by the mobile communication terminal 10 corresponding to the random TRS channel, exist in the received paging signals. When the paging signals having the corresponding TRS channel authentication code are detected, the controller 11 displays a reception report message of other TRS channel signals in step 309.

In step 311, the controller 11 determines if TRS channel change request input is received. When the TRS channel change request input is received, step 313 is performed. That is, the controller 11 disconnects the TRS channel in communication, connects to the corresponding TRS channel, and performs the TRS communication. Thereafter, the process returns to step 301.

When the mobile communication terminal 10 is not in the TRS communication in step 303, the controller 11 connects a corresponding TRS channel and receives paging signals in step 315. In step 317, the controller 11 detects if the paging signals having the TRS channel authentication code, which has been preset by the mobile communication terminal 10 corresponding to the random TRS channel, exist in the received paging signals. When the paging signals having the corresponding TRS channel authentication code are detected, step 319 is performed. However, when the paging signals having the corresponding TRS channel authentication code are not detected, the controller 11 releases the connected TRS channel in step 321.

In step 319, the controller 11 maintains the connection of the random TRS channel in order to receive the TRS signals and perform the TRS communication. Thereafter, the process returns to step 301.

According to the present invention as described above, the mobile communication terminal 10 searches for another TRS channel while performing the TRS communication under the dedicated TRS communication mode. When specific paging signals are detected, the mobile communication terminal 10 informs the user that the TRS signals has been received from said another TRS channel and enables the TRS communication to be performed through said another TRS channel according to the user's selection.

According to the present invention as described above, a mobile communication terminal capable of performing TRS communication periodically searches for another TRS channel or a mobile communication paging channel, even though the mobile communication terminal is in communication or is in TRS communication, and informs a user of reception of TRS paging signals having a TRS channel authentication code or call termination, thereby either performing another TRS communication or mobile communication through connection to a communication channel according to user's selection. Therefore, it is possible to efficiently manage a plurality of TRS channels or mobile communication channels, and receive and process only TRS signals including a specific TRS channel authentication code from among TRS signals of unspecified persons.

Further, it is possible to curtail power consumption of the mobile communication terminal.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for performing communication in a mobile communication terminal capable of performing trunked radio system (TRS) communication, the method comprising the steps of:
changing to a communication standby mode only during a paging reception interval of a random TRS channel, when a current time point corresponds to a paging reception time point of the random TRS channel according to a preset paging period and the mobile communication terminal is currently communicating;
connecting to the random TRS channel;
detecting paging signals including a TRS channel authentication code that is preset corresponding to the random TRS channel;
informing a user of reception of the paging signals including the TRS channel authentication code;
changing to the communication standby mode when a TRS communication change request is received from the user; and
connecting to the TRS channel in order to perform the TRS communication.

2. The method as claimed in claim 1, further comprising the steps of:
disconnecting the TRS channel in TRS communication only during a paging reception interval of a mobile communication paging channel when the current time point corresponds to the paging reception time point of the mobile communication paging channel according to the preset paging period and the mobile communication terminal is in TRS communication;
connecting to the mobile communication channel in order to receive paging signals;
informing the user of call termination when the call termination is included in the paging signals;
disconnecting the TRS channel in communication when a communication connection request is received from the user; and
connecting to a communication channel in order to perform mobile communication.

3. The method as claimed in claim 1, further comprising the steps of:
disconnecting the TRS channel in communication only during the paging reception interval of the random TRS channel when the current time point corresponds to the paging reception time point of the random TRS channel according to the preset paging period and the mobile communication terminal is in TRS communication;
connecting to the random TRS channel;
detecting the paging signals including the TRS channel authentication code having been preset corresponding to the random TRS channel;
informing the user of reception of another TRS signal when the paging signals including the TRS channel authentication code are detected;
disconnecting the TRS channel in the communication when a change request to another TRS communication is received from the user; and
connecting to the random TRS channel in order to perform the TRS communication.

4. The method as claimed in claim 1, wherein the TRS channel authentication code is an authentication code allocated to each TRS communication group including a plurality of mobile communication terminals intended for performance of the TRS communication through the random TRS channel.

5. The method as claimed in claim 1, wherein the paging signals include voice data having the TRS channel authentication code transmitted according to the paging period.

6. The method as claimed in claim 1, wherein the paging period is set to correspond to each TRS channel selected by the user such that the paging reception interval of the mobile communication paging channel does not overlap with the paging reception interval of the TRS channel.

7. The method as claimed in claims 1, wherein the TRS channel authentication code is set by a TRS channel authentication code input from the user, corresponding to at least one TRS channel selected by the user for the TRS communication.

8. A method for performing communication in a mobile communication terminal capable of performing trunked radio system (TRS) communication, the method comprising the steps of:
connecting to a random TRS channel and detecting paging signals including a TRS channel authentication code having been preset corresponding to the random TRS channel, when a current time point corresponds to a paging reception time point of the random TRS channel according to a preset paging period; and
connecting to the random TRS channel and performing the TRS communication, when the paging signals including the TRS channel authentication code are detected.

9. The method as claimed in claim 8, wherein the TRS channel authentication code is an authentication code allocated to each TRS communication group including a plurality of mobile communication terminals intended for performance of the TRS communication through the random TRS channel.

10. The method as claimed in claim 8, wherein the paging signals include voice data having the TRS channel authentication code transmitted according to the paging period.

11. The method as claimed in claim 8, wherein the paging period is set to correspond to each TRS channel selected by the user such that a mobile communication paging reception interval does not overlap with a TRS channel paging reception interval.

12. The method as claimed in claim 8, wherein the TRS channel authentication code is set by a TRS channel authentication code input from the user corresponding to at least one TRS channel selected by the user for the TRS communication.

* * * * *